Oct. 21, 1958     D. M. BENEDICT     2,856,970

FISH HOOK LEADER WINDER

Filed April 15, 1958

INVENTOR.
DON M. BENEDICT
BY
Sellers & Latta
ATTORNEYS

United States Patent Office 2,856,970
Patented Oct. 21, 1958

2,856,970

FISH HOOK LEADER WINDER

Don M. Benedict, Tarzana, Calif.

Application April 15, 1958, Serial No. 728,701

8 Claims. (Cl. 140—122)

This invention relates to the tying of fish hooks to wire leaders, and has as its general object to provide an inexpensive, lightweight portable implement for winding the end portion of a leader that has been inserted through the eye of a fish hook, around the body of the leader to produce a helically wrapped tie.

A particular object is to provide such a device which is adapted to produce a wrapped tie of tightly wound, uniform turns of uniform pitch.

Another object is to provide such a device, adapted to produce a helically wrapped tie with ease and quite rapidly.

Another object is to provide such a device, adapted to automatically guide the turns of wire being wrapped around the body of the leader, so as to produce a uniform wrapping without requiring skill on the part of the operator.

A further object is to provide such a device which can be quickly manipulated to insert the leader into the device preparatory to the wrapping operation and to remove the leader after the wrapping is completed.

Other objects and advantages will become apparent in the ensuing specification and appended drawing in which.

Figure 1:
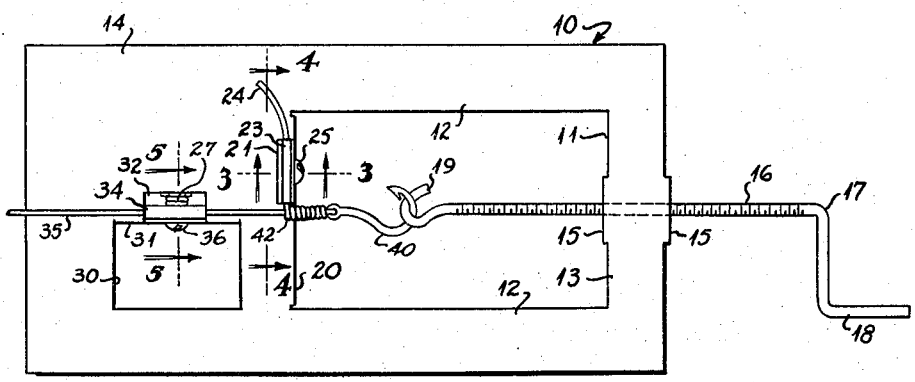
Fig. 1 is a plan view of a wrapping device embodying the invention.
Figure 2:
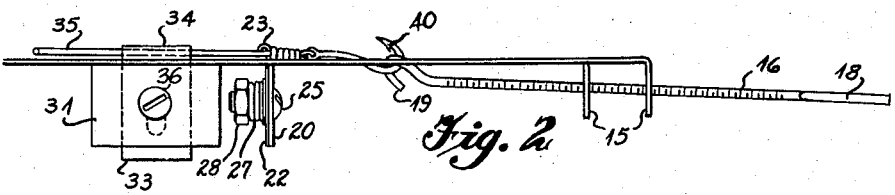
Fig. 2 is a side view of the same.
Figure 3:
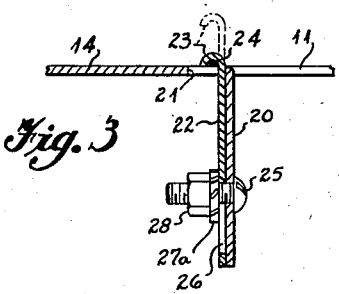
Fig. 3 is a detail sectional view taken on the line 3—3 of Fig. 1.
Figure 4:
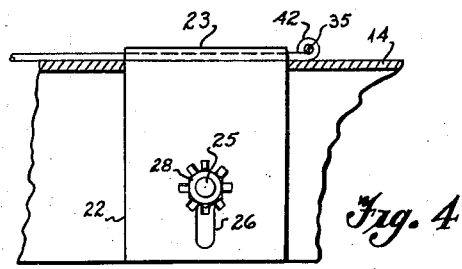
Fig. 4 is a detail sectional view taken on the line 4—4 of Fig. 1.

Referring now to the drawings in detail, I have shown in Figs. 1 to 5 inclusive thereof, as an example of one form in which the invention may be embodied, a leader wrapping implement comprising a support in the form of a flat rectangular plate 10 having an elongated, longitudinally extending opening 11 defined within framing members 12 and 13 at one end thereof, and a wider area 14 at the opposite end thereof. Formed integrally with and turned downwardly from the end frame member 13 are a pair of ears 15 having internally threaded apertures through which is threaded the shaft 16 of a crank 17 having a crank handle 18 at one end thereof and a hook 19 at the other end thereof. Hook 19 may be formed as a separate part and brazed or welded to the end of threaded shaft 16.

An apron 20 is formed integrally with and turned downwardly from the broad area 14 of the support at the opposite end of opening 11. A relatively narrow, short slot 21 is lanced in area 14 adjoining the plane of the rear face of apron 20. I provide a lateral guide member including a flat rectangular shank portion 22 which is extended through slot 21 and a bearing of open channel section 23 at the upper end thereof which is adapted to cooperate with support area 14 in defining a closed guide sleeve in which the end portion 24 of a leader may be received and guided. A threaded stud 25 extends through an aperture in the apron 20 and through a vertical slot 26 in the shank 22. A coil spring 27 or spring loading type lock washer is engaged under compression between the shank 22 and a nut 28 threaded onto the stud 25. By rotating the nut 28 on the stud 25 the tension in spring 27 can be adjusted so as to selectively load the shank 22 in frictional engagement with apron 20 such that the guide member will be frictionally held either in a closed position shown in full lines in Fig. 3 or in an open position shown in dotted lines, wherein the guide member has been shifted upwardly as permitted by slot 26. In the open position, the bearing channel 23 is adapted to freely receive or release the end portion 24 of the leader. The shank 22 is at all times guided by the cooperative action of stud 25 in slot 26 and of shank 22 in slot 21, for sliding movement in a fixed path, restrained against lateral shifting movement. To this end, the shank 22 is fitted in the slot 21 with just sufficient clearance at the ends of the slot to permit free sliding movement.

Figure 5:
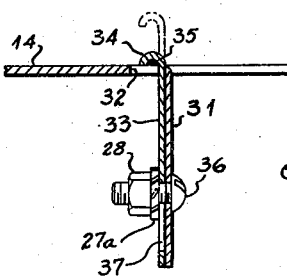
Fig. 5 is a detail sectional view taken on the line 5—5 of Fig. 1.

An opening 30 is provided in the area 14 of the support, a tab 31 being formed integrally with the area 14 at one side of the opening 30 and turned downwardly therein. A smaller rectangular opening 32 is lanced in the support area 14 adjoining the plane of the rear side of tab 31. I provide a longitudinal guide member comprising a shank 33 which is extended downwardly through the opening 32 and a bearing channel 34 on the upper end thereof which is adapted to receive the body portion 35 of a leader. A threaded stud and spring-loaded nut assembly 36 generally similar to the assembly of parts 25—28 is extended through an aperture in the tab 31 and through a vertical slot 37 in the shank 33 to provide spring loaded frictional engagement of the shank 33 against tab 31, the loading being adjustable as in the case of the lateral guide member 25—28, so that the longitudinal guide member 33, 34 can be shifted between a closed position shown in full lines in Fig. 5, in which the leader body 35 is held captive against the support area 14 at the respective ends of opening 32, and an open position shown in dotted lines in which the leader body 35 can be freely inserted beneath and released from the bearing channel 34. As illustrative of the alternate form of spring loading means, Fig. 5 shows a lock washer 27a in lieu of spring 27.

The lateral guide member 23, 22 has one end positioned closely adjacent the axis of leader body 35 as determined by guide channel 34. The crank 16 is disposed upon an axis (as determined by the relative positions of the threaded apertures in ears 15) which is inclined upwardly to intersect the axis of leader body 35 approximately at the axis of lateral guide member 22, 23.

In using the apparatus, to attach a fish hook 40 to a leader, a selected length of the leader at one end thereof is bent at right angles to the remaining body of the leader and is inserted through the eye of the hook 40. This laterally bent end portion of the leader, indicated at 24, is inserted beneath the bearing channel 23 and the latter is clamped down against support area 14, thus confining the leader end portion 24 against any movement except a longitudinal movement pulling through the bearing channel 23 as it is wrapped upon the body 35 of the leader. The crank 16 is rotated in an advancing direction until the hook 19 is in a position to engage the fish hook 40 as positioned by the engagement of leader end 24 in bearing channel 23. This operation may optionally be performed prior to clamping the leader end 24 beneath bearing channel 23. The body 35 of the leader is clamped beneath bearing channel 34 which is lowered until it bears lightly against the portion of the leader bridging across the aperture 32 from end to end thereof, with the leader body 35 resting against the support area 14.

With the body and the end portion of the leader caught beneath their respective guide members, the crank 16 is now rotated reversely causing the end portion 24 to be wrapped around the body portion 35 of the leader as indicated at 42. The pitch of the threads on crank shaft 16 is the same as the pitch to be given to the turns of wrapping 42, and it is thus possible to produce a wrapping of uniform pitch (and with the successive turns in snug contact with one another if so desired). As the crank is rotated, it will be retracted at the same rate as the leader is wound upon itself, thus maintaining the leader end portion 24 tangent to the last turn of wrapping 42. The winding may be completed to the point where substantially no end portion of the leader projects away from the hleical wrapping 42, and the body of the leader may then be released from the bearing channel 34 to remove the hook and leader from the device, ready for use.

Figure 6:
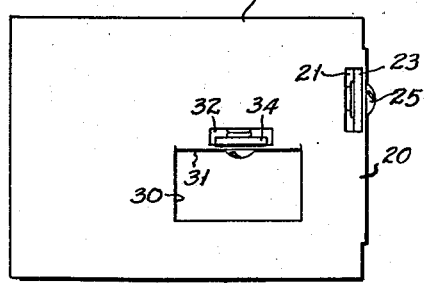
Fig. 6 is a plan view of a device embodying a modified form of the invention.

In the modified form of the invention shown in Fig. 6, the support 14a is relatively short, the frame members 12 and 13 and the aperture 11 framed thereby, being eliminated, and the apron 20 being turned downwardly from one end of the support plate 14a. The remaining parts of the apparatus, i. e., the bearing members 22, 23 and 33, 34 and their respective connections to the support plate 14a are the same as in Figs. 1-5. In the use of this modified device, the fish hook is engaged between the fingers to rotate the same without the assistance of a crank, the guide members functioning in the same manner as in Figs. 1-5.

I claim:

1. In a fish hook leader winder: a support; a bearing on said support, for holding the shaft of a leader for rotation on a fixed axis, said bearing including a movable bearing part adapted to be shifted to an open position for receiving and releasing the leader shaft into and from the bearing respectively; a guide on said support, disposed at right angles to said axis and located adjacent said axis, said guide including a movable guide part that is shiftable to an open position for receiving an end portion of said leader extending transversely from said shaft thereof and threaded through the eye of a fish hook; and a hook rotating screw having an inner end provided with a coupling jaw for driving connection with said fish hook, said support having means in supporting threaded engagement with said screw whereby rotation of said hook to wrap said end portion on the body portion of said leader will retract the fish hook axially in step with the helical wrapping of said leader end portion upon said body portion.

2. A winder as defined in claim 1, including a crank handle on the outer end of said screw.

3. A winder as defined in claim 1, wherein said bearing part and guide part are closed by moving into adjacent opposed relation to said support, with the axes of said leader shaft and end portion disposed substantially in the plane of said support, and wherein said hook rotating screw is disposed on an axis for movement of said coupling jaw in a path adjacent said plane.

4. In a fish hook leader winder: a support including a flat body of sheet material and a pair of tabs formed integrally with said body and bent downwardly in planes at right angles to one another and both normal to the plane of said body; a bearing means on said support, for holding the shaft of a leader for rotation on a fixed axis, said bearing means including a movable bearing part comprising a flat shank and a downwardly opening channel on the upper end thereof adapted to be shifted downwardly to a position closed against said support body to define a sleeve bearing, and to be shifted to an open position for receiving and releasing the leader shaft into and from the bearing respectively; means mounting and guiding said shank against one of said tabs for vertically sliding movement and for holding said bearing means in said closed position; a guide on said support, disposed at right angles to said axis and located adjacent said axis, said guide including a movable part that is shiftable to an open position for receiving and releasing an end portion of said leader extending transversely from said shaft thereof and threaded through the eye of a fish hook; and a hook rotating screw having a coupling jaw for driving connection with said fish hook, said support having means in supporting threaded engagement with said screw whereby rotation of said hook to wrap said end portion on the body portion of said leader will retract the fish hook in step with the helical wrapping of said leader end portion upon said body portion.

5. In a fish hook leader winder: a support of formed sheet material including a flat body and a pair of tabs struck from said body, bent downwardly in planes at right angles to one another, both normal to the plane of said body and each integrally attached along one of its side margins to said body; bearing means for holding the shaft of a leader for rotation on a fixed axis; guide means for receiving and guiding an end portion of said leader extending substantially at right angles from said shaft thereof and threaded through the eye of a fish hook, and for guiding said end portion during wrapping of the same around said shaft to provide a helical tie; each of said bearing and guide means comprising a flat shank and a downwardly opening channel on the upper end thereof adapted to be shifted downwardly to a position in closed association with said support body to define a sleeve bearing and sleeve guide respectively for said leader shaft and end portion respectively, and means mounting and guiding said respective shanks against said respective tabs for vertically sliding movements and for holding said bearing means and guide means in their respective closed positions; and a hook rotating screw having a coupling jaw for driving connection with said fish hook, said support including means in supporting threaded engagement with said screw whereby rotation of said hook to wrap said end portion of the leader on the body portion of said leader will retract the fish hook in step with the helical wrapping of said end portion upon said leader body portion.

6. In a fish hook leader winder; a support of formed sheet material including a flat body and a pair of tabs struck from said body, bent downwardly in planes at right angles to one another, both normal to the plane of said body and each integrally attached along one of its side margins to said body; bearing means for holding the shaft of a leader for rotation on a fixed axis; guide means for receiving and guiding an end portion of said leader extending substantially at right angles from said shaft thereof and threaded through the eye of a fish hook, and for guiding said end portion during wrapping of the same around said shaft to provide a helical tie; each of said bearing and guide means comprising a flat shank in a downwardly opening channel on the upper end thereof adapted to be shifted downwardly to a position in closed association with said support body to define a sleeve bearing and sleeve guide respectively for said leader shaft and end portion respectively; and means mounting and guiding said respective shanks against said respective tabs for vertically sliding movements and for holding said bearing means and guide means in their respective closed positions.

7. A winder as defined in claim 6, wherein said support body is provided with elongated apertures extending alongside the respective planes of the rear faces of said tabs, and including, for each of said shanks, a fastener stud extending through the respective shank and its associated tab, vertically slidable in a slot in one of the associated parts, and arranged to maintain the respective shank in frictional engagement with its respective tab, the side edges of said shanks being closely embraced by the edges of said support body defining the ends of the respective elongated apertures, for vertical sliding movement in fixed paths.

8. A winder as defined in claim 7, wherein said studs are in the form of headed bolts; and including coil springs on said bolts in engagement with the respective shanks and nuts threaded on said bolts and adjustably loading said coil spring to establish a selected frictional engagement between the respective shanks and their tabs, for holding said bearing and guide means in open and closed positions respectively.

No references cited.